(12) United States Patent
Skinner

(10) Patent No.: US 12,390,318 B2
(45) Date of Patent: Aug. 19, 2025

(54) WET TABLE CONVERSION SYSTEM

(71) Applicant: Allen Skinner, San Diego, CA (US)

(72) Inventor: Allen Skinner, San Diego, CA (US)

(73) Assignee: Allevo Veterinary Solutions LLC, San Diego, CA (US)

( * ) Notice: Subject to any disclaimer, the term of this patent is extended or adjusted under 35 U.S.C. 154(b) by 0 days.

(21) Appl. No.: 17/469,919

(22) Filed: Sep. 9, 2021

(65) Prior Publication Data

US 2023/0076432 A1 Mar. 9, 2023

(51) Int. Cl.
*A61D 3/00* (2006.01)
*A01K 13/00* (2006.01)
*A61G 13/10* (2006.01)
*A61D 11/00* (2006.01)

(52) U.S. Cl.
CPC ............... *A61D 3/00* (2013.01); *A01K 13/00* (2013.01); *A61G 13/102* (2013.01); *A61D 11/00* (2013.01)

(58) Field of Classification Search
CPC ........ A61D 3/00; A61D 11/00; A61G 13/102; A01K 13/00
See application file for complete search history.

(56) References Cited

U.S. PATENT DOCUMENTS

| | | | | |
|---|---|---|---|---|
| 2,547,564 A * | 4/1951 | Burke | ..................... | A47K 3/122 4/572.1 |
| 2,661,989 A * | 12/1953 | Weilaud | ............... | A61G 13/102 5/636 |
| 3,083,376 A * | 4/1963 | Johns | ....................... | A61G 7/02 5/632 |
| 3,615,088 A * | 10/1971 | Compton | ................. | A61D 3/00 5/607 |
| 3,757,356 A * | 9/1973 | Freeman | .................. | A61G 7/02 4/456 |
| 4,082,257 A * | 4/1978 | Strickland | .......... | A61G 13/0045 5/606 |
| 4,243,214 A * | 1/1981 | LaRooka | ............. | A61G 13/102 5/606 |
| 4,257,349 A | 3/1981 | Carlin | | |
| 4,620,333 A * | 11/1986 | Ritter | ....................... | A61G 7/02 5/604 |
| 4,635,914 A * | 1/1987 | Kabanek | ................ | A61G 13/12 5/601 |
| D306,100 S * | 2/1990 | Wende | ..................... | A61D 3/00 D6/707.19 |

(Continued)

FOREIGN PATENT DOCUMENTS

BE 905683 2/1987

*Primary Examiner* — Michael H Wang
(74) *Attorney, Agent, or Firm* — Knobbe Martens Olson & Bear LLP

(57) ABSTRACT

An article of manufacture provides a veterinary procedure wet tabletop extension according to the present invention. The tabletop extension includes an examination table having a solid top surface, a bottom surface, and an outer end extending beyond an end of a veterinary tub table when installed, a drain opening about an outer end of the examination table solid top surface, a shallow basin coupled to the bottom surface of the solid examination table beneath the drain opening, a grate filling the drain opening while permitting fluids to drain into the shallow basin, and a drain line coupled to the shallow basin for providing a drainage path to the veterinary tub table.

16 Claims, 4 Drawing Sheets

(56) References Cited

U.S. PATENT DOCUMENTS

| | | | | |
|---|---|---|---|---|
| 5,349,965 A * | 9/1994 | McCarver | ............... | A61B 46/00 |
| | | | | 128/849 |
| 5,542,377 A | 8/1996 | Gemill | | |
| 5,662,069 A * | 9/1997 | Smith | ................... | A01K 13/001 |
| | | | | 119/673 |
| 5,794,570 A * | 8/1998 | Foster | ................... | A01K 13/001 |
| | | | | 119/673 |
| 6,102,073 A * | 8/2000 | Williams | ................ | A61M 1/84 |
| | | | | 137/561 R |
| 6,279,510 B1 * | 8/2001 | Batterton | ................. | A61D 3/00 |
| | | | | 119/753 |
| 6,467,112 B1 * | 10/2002 | Cheng | ..................... | A61D 3/00 |
| | | | | 5/606 |
| 6,935,276 B2 * | 8/2005 | Powers | ................ | A01K 13/001 |
| | | | | 119/753 |
| 9,192,457 B2 * | 11/2015 | Keil | ......................... | A61D 3/00 |
| 11,471,355 B2 * | 10/2022 | Sibai | ....................... | A61M 1/71 |
| 2014/0352699 A1 * | 12/2014 | Born | ................... | A61M 3/0287 |
| | | | | 128/845 |

\* cited by examiner

WET TABLE CONVERSION SYSTEM

TECHNICAL FIELD

This application relates in general to an article of manufacture for providing a veterinary examination device, and more specifically, to an article of manufacture providing a veterinary procedure wet tabletop extension.

BACKGROUND

Veterinary procedures, and especially veterinary dental procedures, typically are performed on the long grates on the tops of tub tables that cover the majority of the top of the tub tables. Performing procedures on top of this long grate is uncomfortable for the operator and suboptimal for patient care. While some of these procedures require use of water that needs to be drained away from the patient, a solid top surface onto which the patient animal may be placed provides a platform that is beneficial for both the operator and the patient animal.

Therefore, a need exists for an article of manufacture for providing a veterinary procedure wet tabletop extension. The present invention attempts to address the limitations and deficiencies in prior solutions according to the principles and example embodiments disclosed herein.

SUMMARY

In accordance with the present invention, the above and other problems are solved by providing an article of manufacture for a veterinary procedure wet tabletop extension according to the principles and example embodiments disclosed herein.

In one embodiment, the present invention is an article of manufacture for providing a veterinary procedure wet tabletop extension. The tabletop extension includes an examination table having a solid top surface, a bottom surface, and an outer end extending beyond an end of a veterinary tub table when installed, a drain opening about an outer end of the examination table solid top surface, a shallow basin coupled to the bottom surface of the solid examination table beneath the drain opening, a grate filling the drain opening while permitting fluids to drain into the shallow basin, and a drain line coupled to the shallow basin for providing a drainage path to the veterinary tub table.

In another aspect of the present invention, the solid examination table is made of stainless steel.

In another aspect of the present invention, the solid examination table has a center of gravity over the veterinary tub table while extending beyond the end of the veterinary tub table.

In another aspect of the present invention, the solid examination table couples to the veterinary tub table.

In another aspect of the present invention, the shallow basin is located within the examination table.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
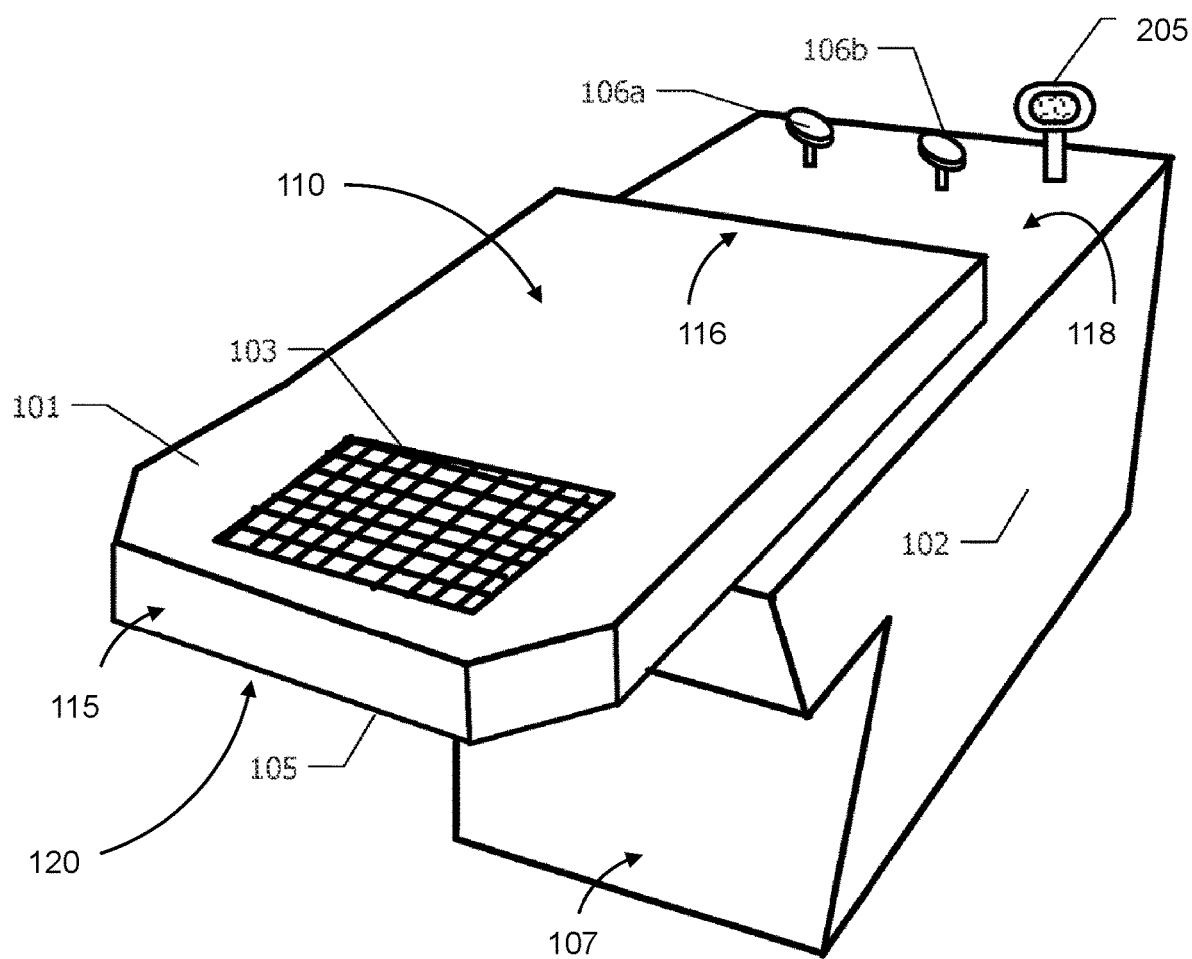
FIG. 1 illustrates an example embodiment of an article of manufacture for providing a veterinary procedure wet tabletop extension according to the present invention.

This application relates in general to an article of manufacture for providing a veterinary examination device, and more specifically, to an article of manufacture for providing a veterinary procedure wet tabletop extension according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using an article of manufacture for providing a veterinary procedure wet tabletop extension according to the present invention. The term user herein refers to one or more users.

The term "invention" or "present invention" refers to the invention being applied for via the patent application with the title "Veterinary Procedure Wet Tabletop Extension." Invention may be used interchangeably with exam table.

In general, the present disclosure relates to an article of manufacture for providing a veterinary procedure wet tabletop extension according to the present invention. To better understand the present invention, FIG. 1 illustrates an example embodiment of an article of manufacture for providing a veterinary procedure wet tabletop extension according to the present invention. The veterinary procedure wet tabletop extension 101 is mounted on top of a veterinary tub table (wet table) 102. The veterinary tub table 102 typically exposes a significant portion, if not an overwhelming part of, the top surface of the veterinary tub table 102.

The veterinary procedure wet tabletop extension 101 replaces a grate or solid insert and overhangs the front edge 107 of the tub table. The advantage of this configuration of the veterinary procedure wet tabletop extension 101 is that the operator (veterinarian or technician) can sit comfortably at the end of the table as mainly tub tables 102 are in cabinets or are so deep that the front edge 107 goes to the ground or near the ground so there is no room for the operator's legs to fit under the veterinary examination tub table 102. This prior art configuration requires the operator to sit sideways, sit with their legs spread apart, or even worse, stand for an entire procedure. This improved configuration is mainly important for veterinary dentistry, but also can be used for several other procedures.

The veterinary procedure wet tabletop extension 101 provides a place to perform procedures that require water use from dental equipment and/or fixtures 106 a-b, 104, and therefore drainage, while allowing the employee to sit more comfortably with his/her legs under the overhanging section 105. The veterinary procedure wet tabletop extension 101 provides the employee a more comfortable work environment and more room for the animal to lay during surgery. A drain opening 103 provides a water drain path back into the wet table 102. The veterinary procedure wet tabletop extension 101 may sit upon the veterinary tub table 102 such that the center of gravity of the veterinary procedure wet tabletop extension 101 with a patient animal in place remains over the veterinary tub table 102. The wet table extension 101 is configured to have its center of gravity that is positioned over the wet table 102 when the wet table extension rests on a second top surface 118 of the wet table 102. In this manner, the bottom surface 120 is secured to the second top surface 118 via gravity. The overhanging section 105 is configured to be positioned over a user's knee when the user is sitting at the wet table extension 101. The veterinary procedure wet tabletop extension 101 also may be coupled to a veterinary tub table 102 having a length of either 48" or 60" 101. The veterinary procedure wet tabletop extension 101 is solid stainless steel (i.e., structurally solid) except for the drain opening 103 that is covered by a grate. The wet tabletop extension 101 can include a top surface 110, a bottom surface 120, an overhanging section 105, a distal end 116, and/or a proximal end 115. In preferred embodiments, the bottom surface 120 is configured to rest on the second top surface 118 of the wet table 102.

The drain opening 103 is positioned proximate to the proximal end 115. The overhanging section 105 is positioned proximate to the proximal end 115. The solid examination table of the veterinary procedure wet tabletop extension 101 helps an anesthetized patient animal maintain body heat better than when lying on an open grate. The solid examination table of the veterinary procedure wet tabletop extension 101 is solid except for the overhanging section 105 that includes a grated drain opening 103 positioned a shallow basin 202 that drains into the tub table 102. The basin 202 is positioned within the wet tabletop extension 101 proximate to the overhanging section 105. Since veterinary dentistry procedures are typically lengthy, having a more comfortable seating position is important. In addition, a large amount of water is used and needs to be drained with veterinary dentistry procedures. The combination of these requirements makes this table beneficial to veterinary clinics performing dental procedures on tub tables or any procedure that requires drainage and the operator to sit along the table. In some embodiments, the top surface 110 is substantially planar and rectangular as well as includes a longitudinal axis that extends along the length of the wet table 102 when the wet table extension 101 rests on the second top surface 118.

Figure 2:
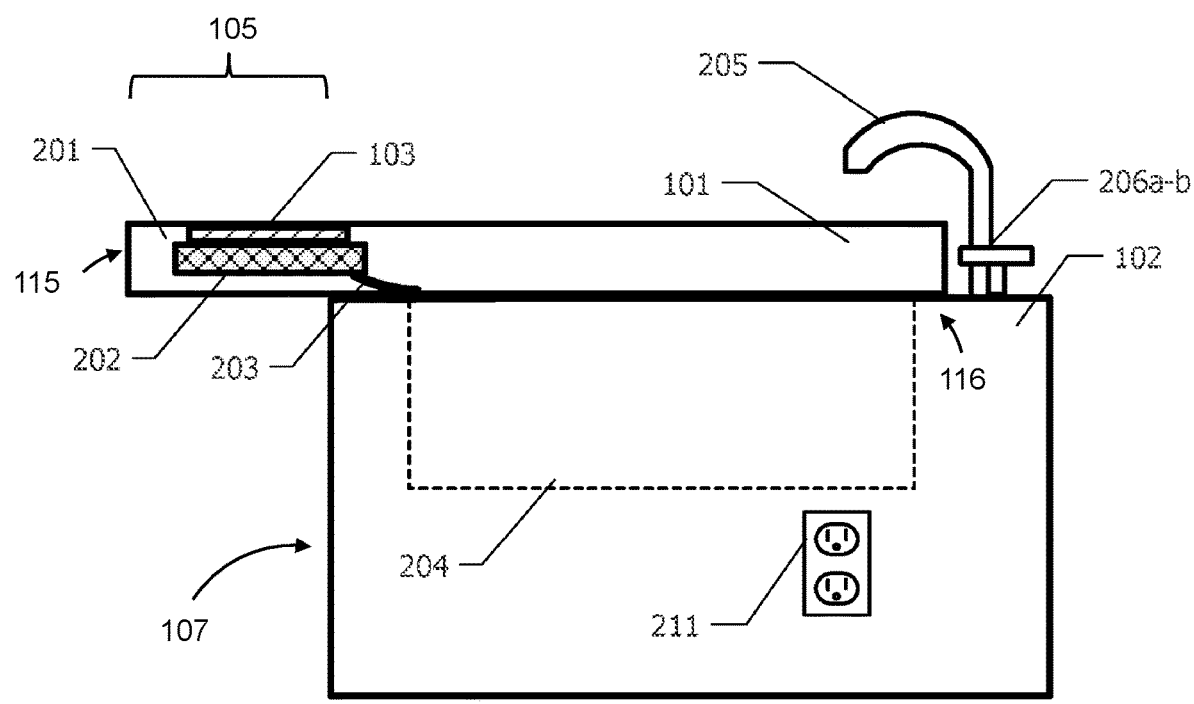
FIG. 2 illustrates a side view of an article of manufacture for providing a veterinary procedure wet tabletop extension according to the present invention.

FIG. 2 illustrates a side view of an article of manufacture providing a veterinary procedure wet tabletop extension according to the present invention. The veterinary procedure wet tabletop extension 101 rests on the veterinary tub table 102 having fixtures 205, 206a-b at one end. A drainage tub 204 is located within the veterinary tub table 102. The veterinary tub table 102 may include other accessories including electrical outlets 211, lights (not shown), a water sprayer, and other accessories useful to the operator.

At the overhanging section 107 of the veterinary procedure wet tabletop extension 101, the drain opening 103 is positioned over a shallow basin 202. A drain line 203 empties the shallow basin 202 into the drainage tub 204 of the wet tabletop extension 101. In other words, the drain line 203 is functionally and fluidically coupled to the basin 202 and is configured to empty contents of the basin 202 into the drainage tub 204. The overhanging end 105 of the veterinary procedure wet tabletop extension 101 extends out over the end of the veterinary tub table 102 to create space under the overhanging end 105 of the veterinary procedure wet tabletop extension 101 for the operator to sit with his/her legs under the veterinary procedure wet tabletop extension 101.

Figure 3:
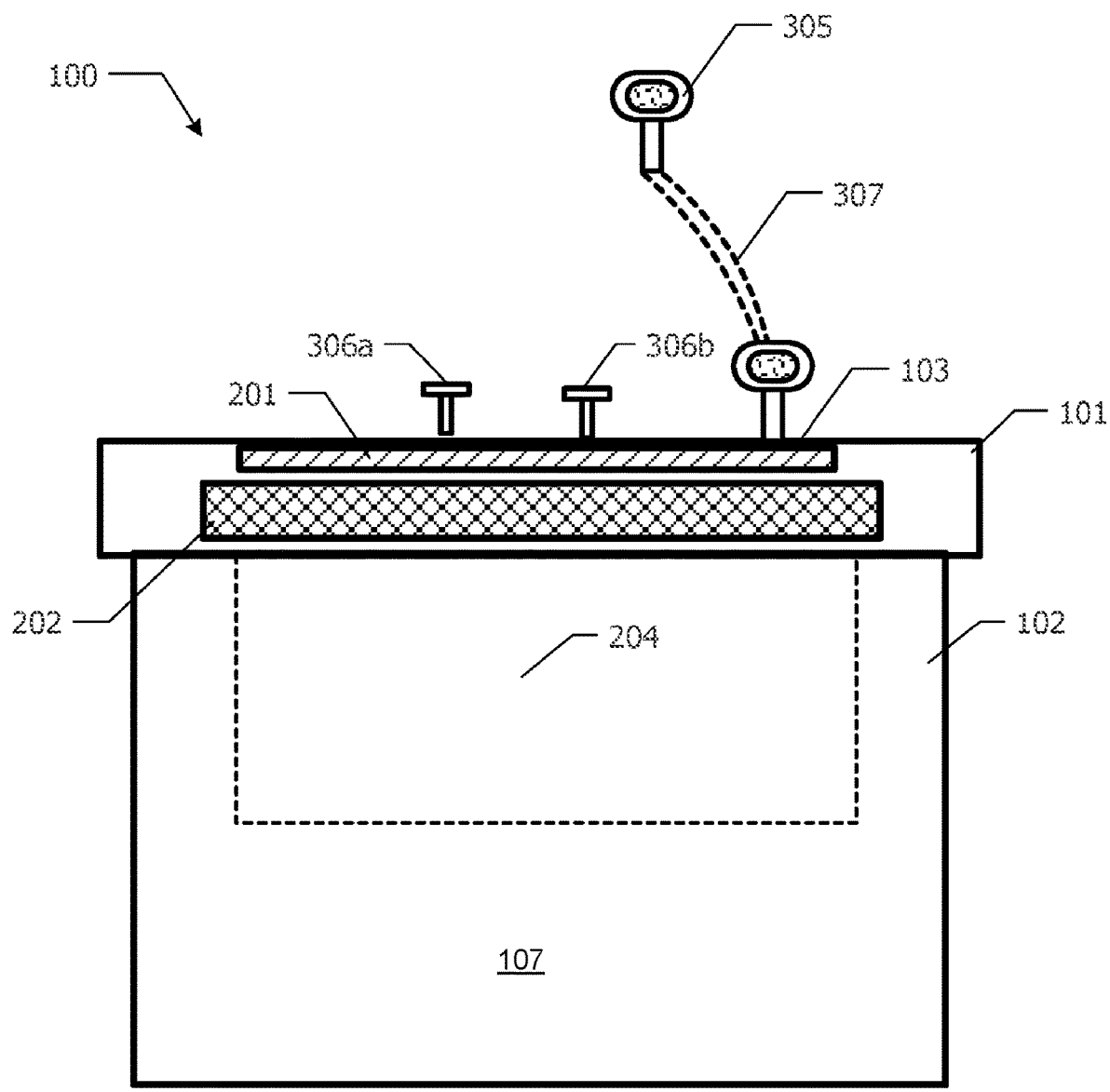
FIG. 3 illustrates an end view of an article of manufacture for providing a veterinary procedure wet tabletop extension r according to the present invention.

FIG. 3 illustrates an end view of an article of manufacture providing a veterinary procedure wet tabletop extension according to the present invention. The veterinary procedure wet tabletop extension 101 is shown on top of the veterinary tub table 102 with the drainage tub 204 within the veterinary tub table 102 and fixtures including a water sprayer 305 coupled to a water line 307 controlled by hot and cold valves 206a-b. The drain opening 103 is positioned over a shallow basin 202 that collects water used in a procedure that may drain into the drainage tub 204.

Figure 4:
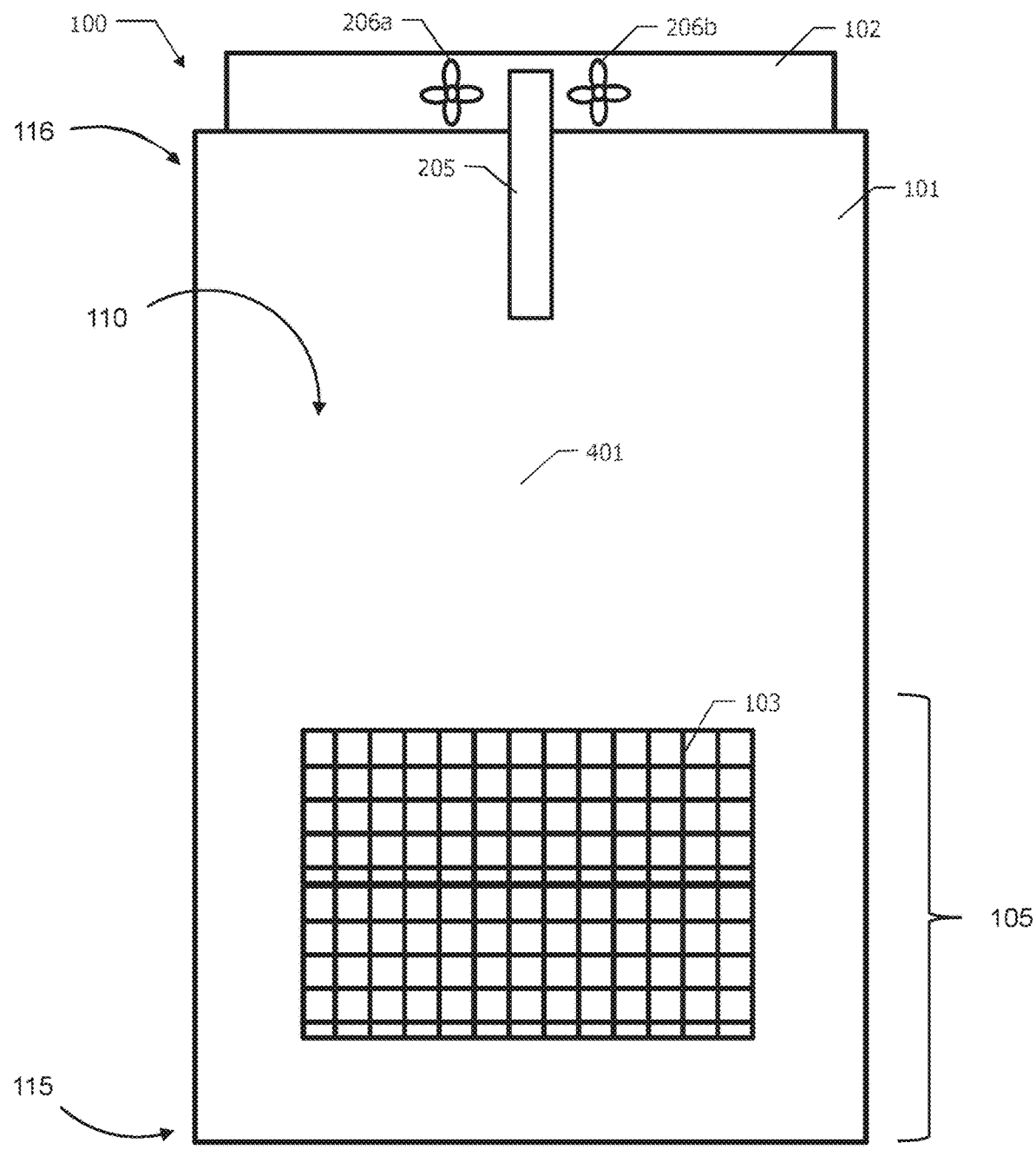
FIG. 4 illustrates a top view of an article of manufacture for providing a veterinary procedure wet tabletop extension according to the present invention.

FIG. 4 illustrates a top view of an article of manufacture providing a veterinary procedure wet tabletop extension according to the present invention. The veterinary procedure wet tabletop extension 101 is shown on top of the veterinary tub table 102. The drain opening 103 is positioned over a shallow basin 202 at the overhanging section 107 of the veterinary procedure wet tabletop extension 101. The patient animal may be placed on the solid top 401 of the veterinary procedure wet tabletop extension 101 with a portion of the animal being treated oriented over the drain opening 103. This configuration provides an improved workspace for the treatment of patient animals.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A wet table top extension system, comprising:
   a table comprising a top surface and a drainage tub, the top surface of the table comprising a first end, a second end and an opening to the drainage tub positioned between the first end and the second end;
   an extension body secured to the top surface of the table, the extension body comprising:
   a proximal end contacting the table and positioned covering the opening to the drainage tub, the proximal end having a top surface impermeable to fluid, and the proximal end configured to receive an animal;
   a distal end extending beyond the first end of the table and forming an overhanging portion, the overhanging portion configured to be positioned over a user's knee when the user is sitting at the table;
   a basin positioned at least partially within the overhanging portion of the extension body, the basin configured to collect fluid;
   a drain opening formed into a top surface of the extension body and configured to allow fluid to enter the basin; and
   a drain line fluidically connecting the basin and the drainage tub of the table.

2. The wet table top extension system of claim 1, wherein the extension body comprises stainless steel.

3. The wet table top extension system of claim 1, wherein the extension body is secured to the table via gravity.

4. The wet table top extension system of claim 1, wherein the extension body is substantially planar and rectangular.

5. The wet table top extension system of claim 1, wherein the extension body comprises a longitudinal axis that extends along a length of the table when the extension body rests on the table.

6. The wet table top extension system of claim 1, wherein the extension body has a center of gravity positioned over the table.

7. The wet table top extension system of claim 1, wherein the table is a wet table.

8. The wet table top extension system of claim 1, wherein the drain opening comprises a grate.

9. The wet table top extension system of claim 1, wherein the table comprises at least one fixture.

10. The wet table top extension system of claim 9, wherein the at least one fixture comprises at least one of a water sprayer and a water valve.

11. The wet table top extension system of claim 9, wherein the at least one fixture is positioned proximate a second end of the table.

12. The wet table top extension system of claim 11, wherein the extension body is configured to extend across the top surface of the table towards the at least one fixture.

13. The wet table top extension system of claim 1, wherein the drain line extends through an interior of the extension body from the basin to the drainage tub.

14. The wet table top extension system of claim 13, wherein the drain line extends laterally through the interior of the extension body.

15. The wet table top extension system of claim 1, wherein the basin has a length that is greater than a length of the drain opening.

16. The wet table top extension system of claim 1, wherein the basin is positioned above and spaced apart from the drainage tub.

* * * * *